United States Patent
Brunner et al.

(10) Patent No.: US 7,278,473 B2
(45) Date of Patent: Oct. 9, 2007

(54) EXHAUST GAS HEAT EXCHANGER AND METHOD FOR THE PRODUCTION THEREOF

(75) Inventors: Steffen Brunner, Weissach Im Tal (DE); Thomas Bächner, Dettingen (DE); Bernd Grünenwald, Nürtingen (DE); Joachim Schemel, Ebersbach (DE)

(73) Assignee: BEHR GmbH & Co., Stuttgart (DE)

( * ) Notice: Subject to any disclaimer, the term of this patent is extended or adjusted under 35 U.S.C. 154(b) by 52 days.

(21) Appl. No.: 10/518,590

(22) PCT Filed: Jun. 23, 2003

(86) PCT No.: PCT/EP03/06574

§ 371 (c)(1),
(2), (4) Date: Dec. 21, 2004

(87) PCT Pub. No.: WO04/001203

PCT Pub. Date: Dec. 31, 2003

(65) Prior Publication Data

US 2005/0263272 A1    Dec. 1, 2005

(30) Foreign Application Priority Data

Jun. 25, 2002    (DE) ................................ 102 28 246

(51) Int. Cl.
*F28F 9/02*    (2006.01)
(52) U.S. Cl. .................................. 165/158; 29/890.043

(58) Field of Classification Search ..................... None
See application file for complete search history.

(56) References Cited

U.S. PATENT DOCUMENTS

| | | | | |
|---|---|---|---|---|
| 2,577,124 A | * | 12/1951 | Newcomer | 29/890.044 |
| 3,768,132 A | * | 10/1973 | Garber | 29/890.054 |
| 5,542,715 A | | 8/1996 | Mantoan et al. | |
| 6,269,870 B1 | * | 8/2001 | Banzhaf et al. | 165/158 |
| 7,048,042 B2 | * | 5/2006 | Juschka | 165/173 |
| 2002/0162651 A1 | * | 11/2002 | Nakagome et al. | 165/158 |
| 2004/0182547 A1 | * | 9/2004 | Birkert et al. | 165/83 |

FOREIGN PATENT DOCUMENTS

| | | |
|---|---|---|
| DE | 195 12 438 A1 | 10/1996 |
| DE | 199 07 163 A1 | 10/1999 |
| DE | 100 48 118 A1 | 4/2002 |
| EP | 0 826 126 B1 | 6/1999 |
| EP | 0 736 674 B1 | 3/2000 |
| EP | 1 153 690 A1 | 1/2001 |
| EP | 1 154 143 A1 | 11/2001 |
| JP | 63 137595 A | 6/1988 |
| JP | 01 131969 A | 9/1989 |
| JP | 09 310996 A | 12/1997 |
| JP | 9-310996 A | 12/1997 |

* cited by examiner

*Primary Examiner*—Allen J. Flanigan
(74) *Attorney, Agent, or Firm*—Foley & Lardner LLP

(57) ABSTRACT

The invention relates to an exhaust gas heat exchanger for motor vehicles, comprising a cluster of exhaust pipes (10) which are soldered on the front surface thereof to pipe bottoms, and a housing jacket (3, 3b) which is welded to the pipe bottoms (7). According to the invention, the pipe bottoms are welded to the housing jacket (3b) by means of peripheral welds (11).

5 Claims, 3 Drawing Sheets

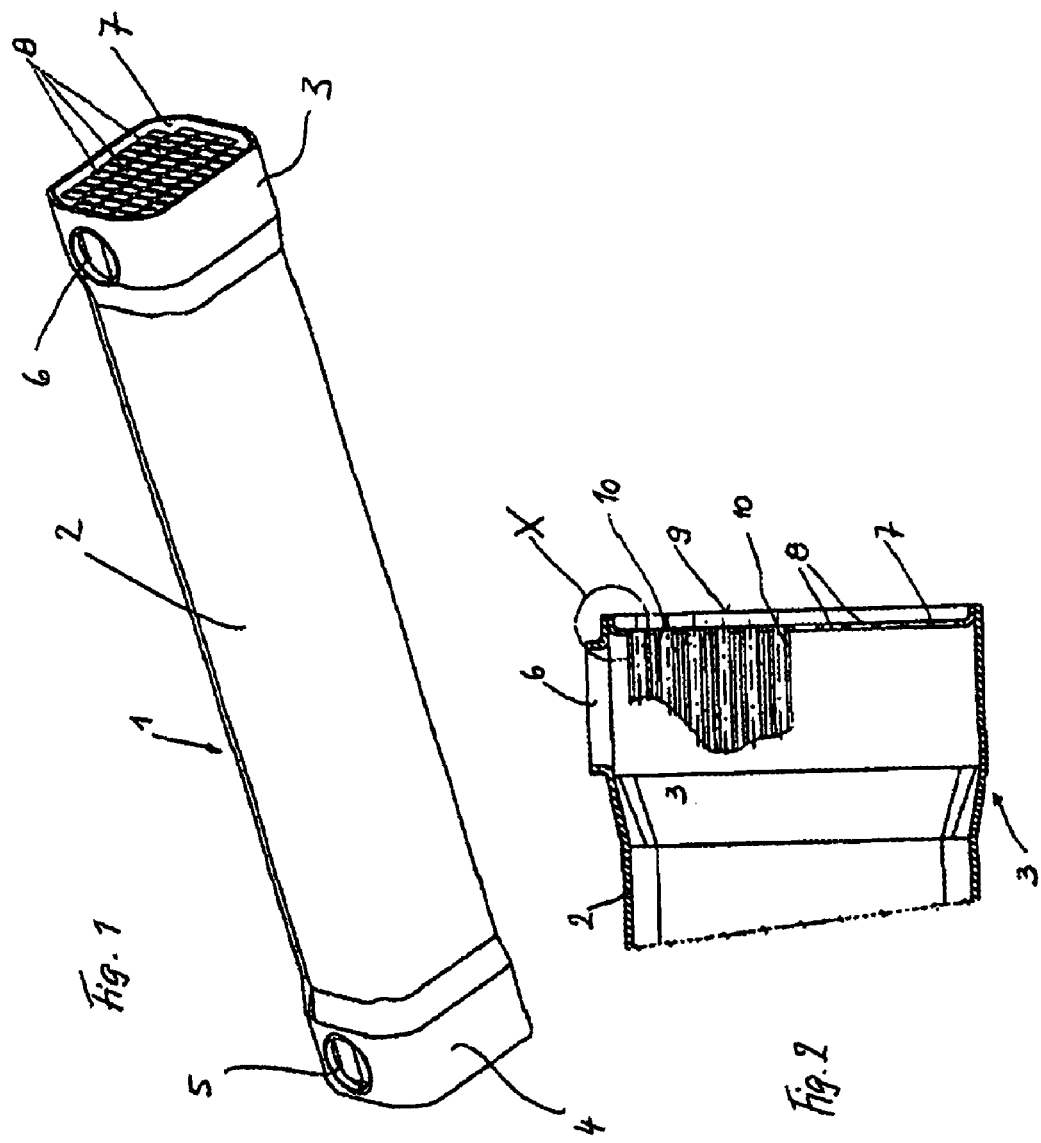

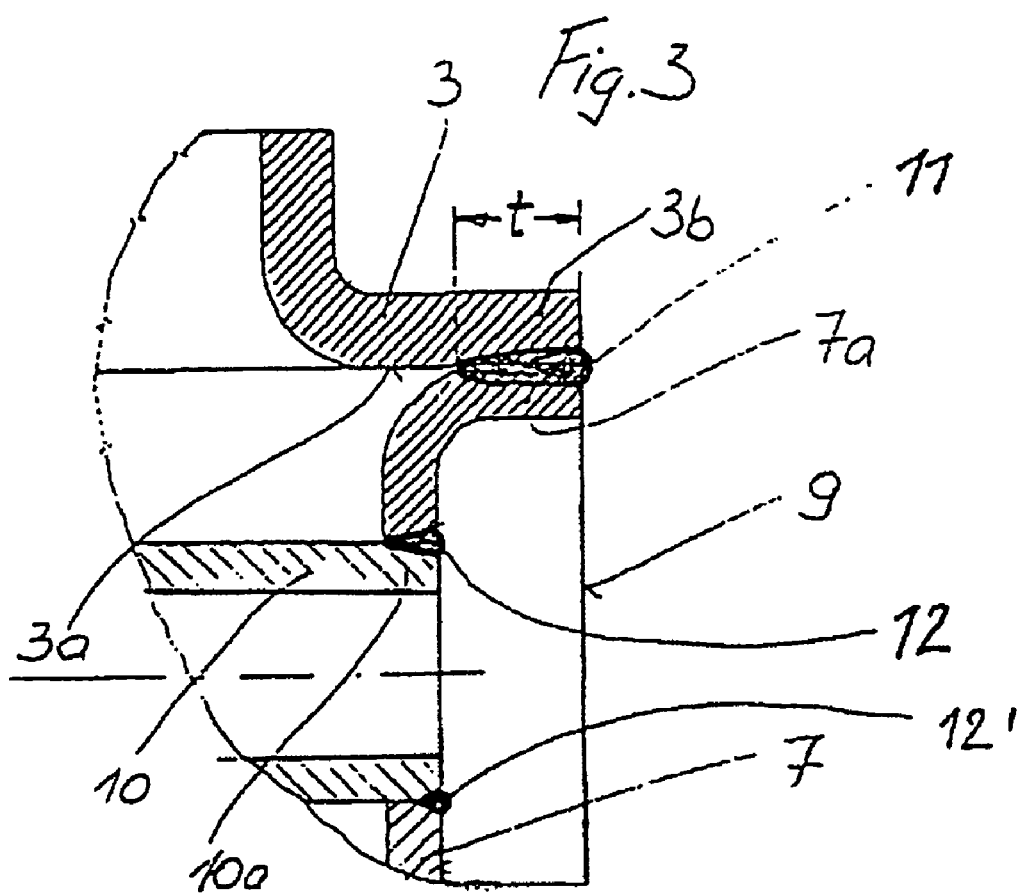

EXHAUST GAS HEAT EXCHANGER AND METHOD FOR THE PRODUCTION THEREOF

BACKGROUND OF THE INVENTION

The invention relates to an exhaust gas heat exchanger for motor vehicles, of the same type which is known from commonly assigned DE-A 199 07 163. The invention also relates to a method for production of an exhaust gas heat exchanger such as this.

DE-A 199 07 163 discloses a welded exhaust gas heat exchanger which comprises a housing casing, a pipe or tube bundle and pipe bases (header plates), with the ends of the pipes being welded in the pipe bases and the pipe bases being welded via circumferential beads to the housing casing. The pipe ends are welded in the pipe base at the ends, while the pipe bases are welded circumferentially to the housing casing, that is to say the laser beam which is used for the welding process is directed at right angles to the pipe axes. In this case, the laser beam is either passed around the housing or the laser beam is stationary and the housing is rotated about its longitudinal axis. The different welding directions (with respect to the direction of the laser beam) make it necessary to clamp the workpiece, that is to say the heat exchanger block, at least twice successively. This increases the production complexity. Furthermore, in the known production method, provision is made for the heat exchanger block, that is to say the housing casing, not to be cut to length until two circumferential weld beads have been applied, to be precise by means of an additional laser beam step. This also involves additional production complexity.

One object of the present invention is to improve the welding carried out on an exhaust gas heat exchanger of the type mentioned initially. Another object of the invention is to provide a simplified method for its production, in particular for welding of this exhaust gas heat exchanger.

SUMMARY OF THE INVENTION

This object is achieved by the present invention. According to one embodiment of the present invention, both welded joints can be produced, that is to say the pipe/pipe base joint and the pipe base/housing casing joint, can be produced in a jig for the heat exchanger block, i.e., effectively in one operation. Both weld beams can be produced from the end face of the heat exchanger block, so that the block needs not be moved in the jig. Furthermore, this avoids the additional process step of cutting the housing casing to length by using the welding tool for cutting, so that the housing casing is cut to length even before the welding process.

According to one advantageous refinement of the invention, the pipe base is pot-shaped, that is to say it is provided with a raised rim, which ends flush with the housing casing and can thus be welded to the housing casing relatively easily by means of a circumferential bead.

The production method according to the invention reduces the unit costs of the exhaust gas heat exchanger, because the production times are reduced. The heat exchanger block, comprising pipes, pipe bases and the housing casing, is first of all assembled with the housing casing already having been cut to length. The heat exchanger block is then placed in a jig and the end welding is carried out by means of a circumferential bead and a large number of pipe beads. Since the welding is carried out from one and the same side, specifically from the end, all the weld beads can be made parallel to one another, that is to say effectively at the same time. This further reduces the production times.

One exemplary embodiment of the invention will be described in more detail in the following text and is illustrated in the drawing, in which:

BRIEF DESCRIPTION OF THE DRAWINGS

FIG. 1 shows an exhaust gas heat exchanger,

FIG. 2 shows a section through the end area of the exhaust gas heat exchanger,

FIG. 3 shows a detail X from FIG. 2,

DETAILED DESCRIPTION OF THE DRAWINGS

Figure 4:
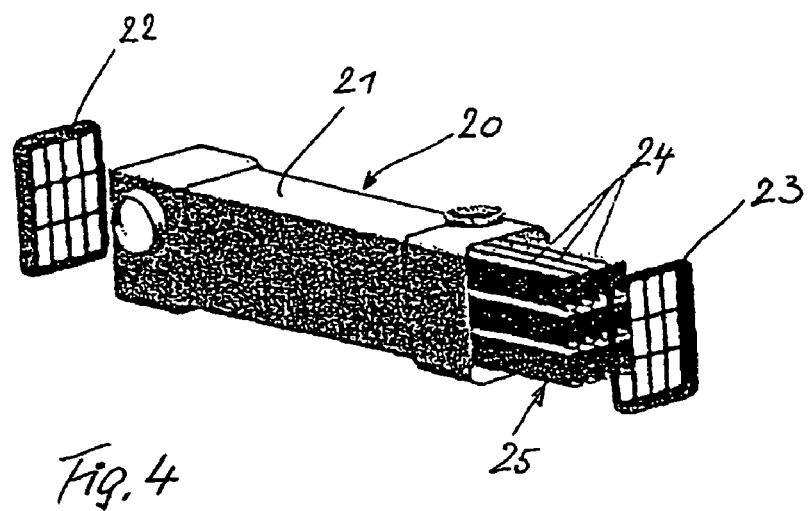
FIG. 4 shows the exhaust gas heat exchanger with its individual parts illustrated in an exploded form.

FIG. 1 shows an exhaust gas heat exchanger 1 which can be used as an exhaust gas cooler for cooling down exhaust gases when exhaust gas feedback is in use. A housing casing 2, made of stainless steel sheet, has two end areas 3 and 4 with a slightly wider cross section and which each have a coolant inlet opening 5 and a coolant outlet opening 6. A pipe base 7 is inserted into the end area 3 on the right in the drawing and has uniformly arranged rectangular openings 8 into which pipe ends, which are not illustrated here, of a pipe bundle are inserted.

FIG. 2 shows the end area 3 from FIG. 1 in the form of a longitudinal cross section through the coolant aperture opening 6. The pipe base 7 is inserted into the end area of the housing casing 2 such that it is flush, and thus forms a common end plane 9. Exhaust pipes 10 are inserted into the openings 8 in the pipe base 7, although only some of the pipes 10 from the entire pipe bundle are illustrated. Exhaust gas flows through the inside of these exhaust pipes 10, with coolant flowing around their outside, which coolant is taken, for example, from a coolant circuit (which is not illustrated) for an internal combustion engine in the motor vehicle.

FIG. 3 shows a detail X from FIG. 2, that is to say the end rim area of the pipe base 7 and end area 3 of the housing casing 2. In its rim area, the pipe base 7 has a rim 7a which is raised approximately at right angles, rests circumferentially against the inner surface 3a of the end area 3, and ends flush at the end with the housing casing 2 or its end 3b, to be precise on the end plane 9. The rim 7a of the pipe base 7 and the end area 3b of the housing casing 2 are connected to one another in a sealed form by means of an end weld bead, which extends axially from end plane 9 to form a so-called circumferential bead 11. The circumferential bead 11 is welded through, that is to say it extends to a depth t; it may also only be welded in, that is to say to a depth less than t. The pipe 10 has a pipe end 10a, which ends approximately flush with the pipe base 7 and is connected to the pipe base 7 by means of a weld bead 12. The weld bead 12 is welded through, that is to say it extends over the entire thickness of the pipe base 7. However, alternatively, it is possible to just weld in the pipe end 10a, as is illustrated in the drawing as an alternative bead 12, which is not welded in so deeply. All of the pipes, 10 are connected to the pipe base 7 by means of a weld bead 12 in the same way. The weld beads 11, 12 and 12' are each produced from the end face of the exhaust gas heat exchanger 1, as will be described in more detail in the following text.

FIG. 4 shows a slightly modified exhaust gas heat exchanger 20 with a housing casing 21, two pipe bases 22, 23 and a pipe bundle 25 which comprises nine exhaust pipes 24, all in the form of an exploded illustration. The exhaust gas heat exchanger 1 or 20 is now produced in such a way that the heat exchanger block, comprising a housing casing 20, the pipe bundle 25 and the pipe bases 22, 23 are first mechanically joined and assembled. During this process, the pipe ends are inserted into the pipe bases 22, 23, and the latter are inserted into the end faces of the housing casing 20. As mentioned above, the housing casing 20 has already been cut to length.

Figures 5, 6:
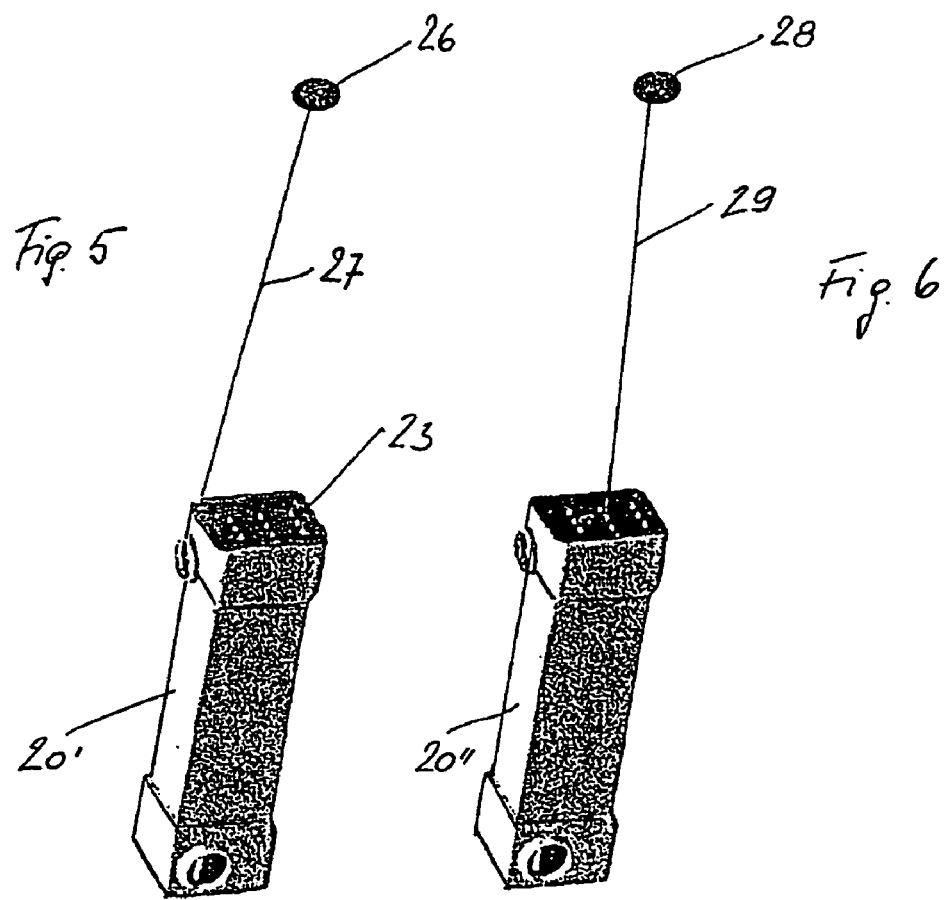
FIG. 5 shows the end welding of the circumferential bead.
FIG. 6 shows the end welding of the pipe/pipe base beads.

FIG. 5 shows the completely assembled block 20' which is held in a clamping apparatus 40 (schematically shown), arranged, for example, vertically. A laser beam welding apparatus is located above the pipe base 23, that is to say in an end extension of the block 20', and is represented schematically by an ellipse 26. This welding apparatus 26 produces a laser beam 27 which produces the circumferential bead 11 illustrated in FIG. 3, that is to say it produces the joint between the pipe base 7 and the housing casing 2 by moving around the circumference once. The laser beam may in this case be at right angles to, or slightly inclined with respect to, a block axis.

FIG. 6 shows, once again schematically, a welding apparatus 28 from which a laser beam 29 is directed at the end face of the heat exchanger block 20". This laser beam 29 produces the weld beads 12 (see FIG. 3) by moving around the circumference of each pipe end. For the sake of simplicity, only one laser beam 29 is illustrated here, although a number of laser beams may be used at the same time, that is to say a maximum number corresponding to the number of pipes 10. The heat exchanger block 20" illustrated in FIG. 6 is likewise held in a clamping apparatus (which is not illustrated), that is to say in the same way as in FIG. 5. The heat exchanger block 20' or 20" therefore need be clamped in only once to produce the weld beads 11 and 12. The weld beads 11 and 12 need not be produced successively but in fact can be produced synchronously, that is to say they can be produced approximately at the same time, thus reducing the production times.

The invention claimed is:

1. An exhaust gas heat exchanger suitable for use in a motor vehicle, comprising:
   at least one header plate;
   a bundle of exhaust gas tubes which are welded at least at one end to the at least one header plate; and
   a housing casing which is welded to the at least one header plate,
   wherein the at least one header plate is welded to the housing casing via a circumferential bead which is arranged at one end surface of the housing casing, and
   wherein the circumferential bead extends axially from said end surface to a given depth between the housing casing and the header plate.

2. The exhaust gas heat exchanger as claimed in claim 1, wherein the at least one header plate comprises a raised rim, wherein the rim and the end surface of the housing casing is arranged contiguous to one another and are joined by the circumferential bead.

3. A method for production of an exhaust gas heat exchanger that comprises at least one header plate, a bundle of exhaust gas tubes which are welded at least at one end to the at least one header plate, and a housing casing which is welded to the header plate via a circumferential weld bead which is arranged at an end surface of the housing casing, said circumferential bead extending axially from said end surface to a given depth between the housing casing and the header plate the method comprising:
   assembling the exhaust gas tubes, the at least one header plate and the housing casing into the configuration of a heat exchanger block;
   clamping a configuration of the heat exchanger block into position in a clamping device; and
   welding to each other (1) the housing casing and the at least one header plate, to form the circumferential weld bead, and also (2) the exhaust gas tubes and the at least one header plate, while the configuration is clamped in the same position in the clamping device.

4. The method as claimed in claim 3, wherein the welding is carried out by at least one laser beam.

5. A method as claimed in claim 3, wherein the at least one header plate has a raised rim, and wherein the rim and the end surface of the housing casing are arranged to be contiguous and are connected together by the circumferential bead.

* * * * *